United States Patent
Carballo et al.

(10) Patent No.: US 7,047,168 B2
(45) Date of Patent: May 16, 2006

(54) METHOD AND SYSTEM FOR PROVIDING CONSTRAINT-BASED GUIDANCE TO A DESIGNER IN A COLLABORATIVE DESIGN ENVIRONMENT

(75) Inventors: Juan-Antonio Carballo, Austin, TX (US); Stephen W. Director, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 891 days.

(21) Appl. No.: 10/050,773

(22) Filed: Jan. 16, 2002

(65) Prior Publication Data

US 2003/0135352 A1  Jul. 17, 2003

(51) Int. Cl.
*G06F 17/10* (2006.01)

(52) U.S. Cl. .............................. 703/2; 700/97; 716/10
(58) Field of Classification Search .................... 703/2; 700/97, 182; 716/1, 5, 6, 10
See application file for complete search history.

(56) References Cited

U.S. PATENT DOCUMENTS

| | | | |
|---|---|---|---|
| RE36,602 E | 3/2000 | Sebastian et al. | |
| 6,063,126 A | 5/2000 | Borduin | |
| 6,086,617 A | 7/2000 | Waldon et al. | |
| 6,445,782 B1* | 9/2002 | Elfe et al. | 379/201.01 |
| 6,587,992 B1* | 7/2003 | Marple | 716/2 |
| 6,651,228 B1* | 11/2003 | Narain et al. | 716/5 |
| 6,868,716 B1* | 3/2005 | Okano et al. | 73/146 |
| 6,882,892 B1* | 4/2005 | Farrah et al. | 700/97 |

OTHER PUBLICATIONS

Ten Bosch, K.O., et al., Design Flow Management In The NELSIS CAD Framework, 28th ACM/IEEE Design Automation Conference, ACM 0-89791-395-7/91/0006/0711, 1991, pp. 711-716.
Carballo, Juan-Antonio, et al., Constraint Management For Collaborative Electronic Design, Proc. DAC, Las Vegas, Nevada, Jun. 1999.
Sutton, Peter R., et al., Framework Encapsulations: A New Approach To CAD Tool Interoperability, DAC, Jun. 1998, San Francisco, California, pp. 134-139.
Kumar, Vipin., Algorithms For Constraint-Satisfaction Problems: A Survey, AI Magazine, 1992, pp. 32-44.
Carballo, Juan-Antonio, et al., Application Of Constraint-Based Heuristics In Collaborative Design, DAC 2001, Las Vegas, Nevada.
Bitner, J., et al., Backtrack Programming Techniques, Communications of the ACM, vol. 18, Issue 11, Nov. 1975.

* cited by examiner

*Primary Examiner*—Albert W. Paladini
(74) *Attorney, Agent, or Firm*—Brooks Kushman P.C.

(57) ABSTRACT

Method and system are provided for providing constraint-based guidance to a designer to support the application of useful constraint-based heuristics in complex collaborative design, thus reducing late conflicts and facilitating their resolution when they happen. The invention can be applied to any collaborative problem-solving task such as a collaborative engineering activity or the design of corporate strategies. In the method and system, designers receive constraint-based feedback that enables them to apply constraint-based heuristics that consider the simultaneous effect of all design constraints.

20 Claims, 4 Drawing Sheets

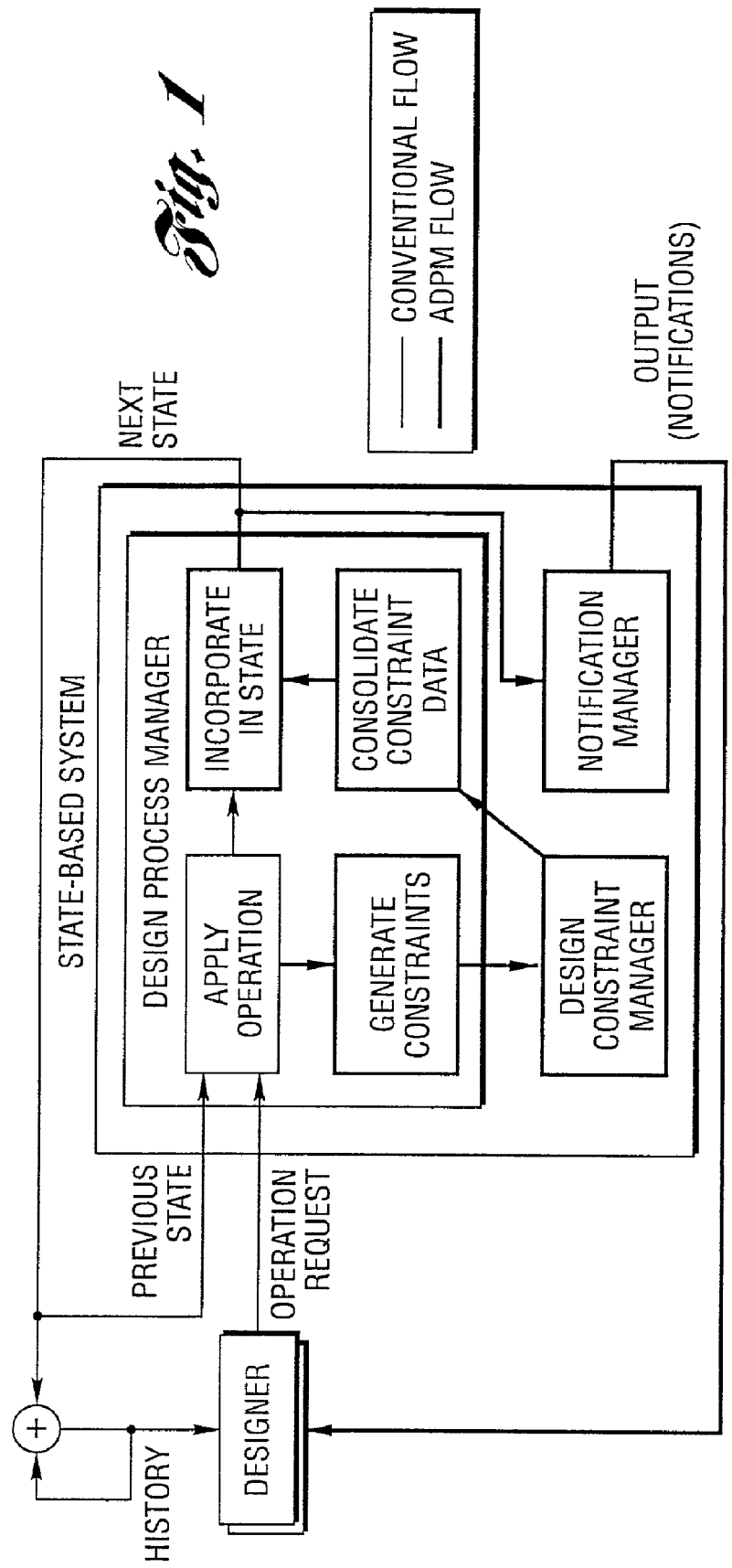

Domain: Amplifier+Mixer
Object name: LNA+Mixer
Version number: 1.0.1 (current)

| | | |
|---|---|---|
| Diff-pair-W | String | AbstractionLevels: Transistor, Geometry |
| | Consistent values: (2.500000 3.698225) | |
| Freq-ind | String | AbstractionLevels: Transistor, Geometry |
| | Consistent values: (0.174255 0.500000) | |
| LNA-gain | String | AbstractionLevels: Geometry |
| | Consistent values: (51.121929 181.420120) | |
| LNA-power | String | AbstractionLevels: Geometry |
| | Consistent values: (164.438431 200.000000) | |
| LNA-Zin | String | AbstractionLevels: Geometry |
| | Consistent values: (50.000000 73.964500) | |

[Done]  [View...]  [Create New Version...]

*Fig. 2*

Constraints and properties for problem: Design a Amplifier+Mixer at the Geometry level

CONSTRAINTS

| Constraint/Argument | Status/Value |
|---|---|
| ▲ MaxLNA-P-C11 | Consistent |
| ▲ MinLNA-Zin-C8 | Consistent |
| ▲ TotalGain-C12 | Consistent |
| ▲ LNA-Zin-C9 | Consistent |
| ▲ LNAGain-C10 | Consistent |
| ▲ LNAPower-C7 | Consistent |

PROPERTIES

| | | | |
|---|---|---|---|
| ▼ P.Diff-pair-W8 | 3 | <no value assigned> | LNA+Mixer |
|    LNAPower-C7 | | Consistent | |
|    LNA-Zin-C9 | | Consistent | |
|    LNAGain-C10 | | Consistent | |
| ▲ P.LNA-power9 | 2 | <no value assigned> | LNA+Mixer |
| ▲ P.LNA-Zin10 | 2 | <no value assigned> | LNA+Mixer |
| ▲ P.MinLNA-Zin11 | 1 | 50 | LNA+Mixer |
| ▲ P.LNA-gain12 | 2 | <no value assigned> | LNA+Mixer |
| ▼ P.Freq-ind13 | 2 | <no value assigned> | LNA+Mixer |
|    LNAGain-C10 | | Consistent | |

[ Close ]  [ View property history... ]

*Fig. 3*

Constraints and properties for problem: Design a Amplifier+Mixer at the Geometry level

CONSTRAINTS

| | | |
|---|---|---|
| ▲ LNA-Zin-C9 | Violated | |
| ▼ TotalGain-C13 | Violated | |
| ▼ P.Mintransceiver-gain16 | 32 | |
| ▼ P.LNA-gain12 | <no value assigned> | |
| | [48.000000 48.000000] required by LNAGain-C10 | |
| ▼ P.Insertion-loss6 | <no value assigned> | |
| | [-19.121931 -19.121931] required by FilterLoss-C4 | |
| ▲ LNAGain-C10 | Consistent | |
| LNAPower-C7 | Consistent | |

PROPERTIES

| Property/Constraint | # c's | Value/Status | Object | Connected violations |
|---|---|---|---|---|
| ▲ P.Diff-pair-W6 | 3 | 2.5 | LNA+Mixer | 2 |
| ▲ P.LNA-power9 | 2 | <no value assigned> | LNA+Mixer | 1 |
| ▲ P.LNA-Zin10 | 2 | <no value assigned> | LNA+Mixer | 1 |
| ▲ P.MinLNA-Zin11 | 1 | 40 | LNA+Mixer | 1 |
| ▲ P.LNA-gain12 | 2 | <no value assigned> | LNA+Mixer | |
| ▲ P.Freq-ind13 | 2 | 0.2 | LNA+Mixer | |
| ▲ P.MaxLNA-power14 | 1 | 200 | LNA+Mixer | |
| ▲ P.Maxfreq-ind15 | 1 | 0.5 | LNA+Mixer | |

Close     View property history...

*Fig. 4*

METHOD AND SYSTEM FOR PROVIDING CONSTRAINT-BASED GUIDANCE TO A DESIGNER IN A COLLABORATIVE DESIGN ENVIRONMENT

BACKGROUND OF THE INVENTION

1. Field of the Invention

This invention relates to methods and systems for providing constraint-based guidance to a designer in a collaborative design environment.

2. Background Art

Complex engineering designs, including hardware and software systems, are subject to ever-tighter time-to-market constraints and thus involve ever-larger teams, where multiple subsystems are developed in parallel by different subteams. Unfortunately, this concurrent design results in conflicts or constraint violations among multiple designers being detected late in the design process. Fixing these conflicts requires very expensive rework. If one views the design as a set of variables related by a group of constraints, then these conflicts can be seen as constraint violations. Expensive rework can then be substantially reduced by aiding designers in considering the simultaneous effect of all constraints. For this aid to be most useful, though, it must give designers direct clues to improve the team's design space search process.

Design can be viewed as a search process in a design space restricted by constraints. Constraint-based search heuristics can substantially improve search algorithms and thus may significantly accelerate design convergence.

While heuristics are often used by designers and CAD tools to search for design solutions, design environment work has not focused on providing the constraint-based guidance described above.

For example, K. O. ten Bosch et al., "Design Flow Management in the Nelsis CAD Framework", PROC. DAC, June 1991 presents a flow management system which provides support to manage a design process, but does not provide constraint-based support. As a result, late constraint violations can easily happen that require very costly rework.

J. A. Carballo and S. Director, "Constraint Management for Collaborative Electronic Design", PROC. DAC, Las Vegas, Nev., USA, June 1999 describes software techniques utilized in CCM. (CCM is a software methodology for managing constraints that leverages existing constraint-based systems and CAD tools.)

P. Sutton and S. Director, "Framework Encapsulations, A New Approach to CAD Tool Interoperability", PROC. 35TH DAC, June 1998 describes a conventional design process management system which provides feedback about the status of the design process at all times, but does not provide constraint-based heuristic support. As a result, more design operations are required with this system to complete complex designs.

V. Kumar, "Algorithms for Constraint-Satisfaction Problems: A Survey", AI MAGAZINE, 1992; and J. Bitner and E. Reingold, "Backtrack Programming Techniques", COMMUNICATIONS OF THE ACM, Vol. 18, Issue 11, November 1975 show that constraint-based heuristics can substantially improve search algorithms.

U.S. Pat. No. RE 36,602 presents a tool and method to design parts and their manufacturing process. The tool automatically generates the necessary information using a set of predefined templates. It is intended to automate a specific part of the design process based on templates, which is not possible for complex creative designs, but only for designs amenable to selection of predefined parts.

U.S. Pat. No. 6,063,126 presents a system to model and generate designs. The system automatically generates a model or "program" that satisfies all constraints affecting the system.

Design optimization systems have been developed in the prior art. U.S. Pat. No. 6,086,617 discloses a system where the user can direct the optimization process so it follows specific directions and order during the search. The system automates design optimization which is only possible for simple designs.

SUMMARY OF THE INVENTION

An object of the present invention is to provide an improved method and system for providing constraint-based guidance to a designer in a collaborative design environment, thus reducing late conflicts or violations and facilitating their resolution when they happen.

Another object of the present invention is to provide an improved method and system for providing constraint-based guidance to a designer in a collaborative design environment to help designers apply effective constraint-based heuristics by giving them feedback on their operations that directly support these heuristics. By supporting these heuristics, this invention gives direct clues to designers that significantly improve their design space search process.

In carrying out the above objects and other objects of the present invention, a method for providing constraint-based guidance to a designer in a collaborative design environment is provided. The method includes receiving signals from designers wherein the signals represent design choices for variables of a design. A network of design constraints is generated which represent interactions among the variables of the design. The network of design constraints is evaluated to obtain conflict information in response to the signals. The method further includes transmitting signals to designers affected by the conflict information to provide constraint-based guidance to the affected designers in the collaborative design environment.

The conflict information may include feasible or infeasible values for the variables of the design.

The conflict information may also include design constraints associated with the variables of the design.

The conflict information may further include constraint violations associated with the variables of the design.

The design may be an engineering design, or may be a complex financial plan.

The step of evaluating may include the step of applying a constraint propagation algorithm to the network of design constraints to compute the conflict information.

The design constraints may have an arbitrary form.

The guidance may be constraint-based heuristic support.

Further in carrying out the above objects and other objects of the present invention, a system for providing constraint-based guidance to a designer in a collaborative design environment is provided. The system includes means for receiving signals from designers wherein the signals represent design choices for variables of a design. The system also includes a design process manager for generating a network of design constraints which represent interactions among the variables of the design. The system further includes a constraint manager for evaluating the network of design constraints to obtain conflict information in response to the signals. The system also includes a notification manager for transmitting signals to designers affected by the conflict information to provide constraint-based guidance to the affected designers in the collaborative design environment.

The constraint manager may apply a constraint propagation algorithm to the network of design constraints to compute the conflict information.

Several types of constraint-based information can help effectively apply constraint-based heuristics, including:

Infeasible design subspaces. The design process may be accelerated by focusing first on areas of the design space that have the smallest subspaces not found to be infeasible.

Strongly constrained subspaces. Another heuristic is to focus first on design subspaces affected by the most constraints.

Efficient conflict resolution strategies. Design convergence may also be accelerated by (a) making use of trade-offs produced by constraint margins to fix violations, and (b) executing design operations that will fix many violations at a time.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a block diagram which represents an APPM design process model which, in turn, represents a process by which designers in a team interact with a design management system; an architecture is defined that can be used to implement the invention;

FIG. 2 is a schematic view of a screen shot which illustrates subspaces not found to be feasible;

FIG. 3 is a schematic view of a screen shot which illustrates properties and their related constraints; and FIG. 4 is a schematic view of a screen shot which illustrates support for a circuit designer to resolve conflicts.

DETAILED DESCRIPTION OF THE PREFERRED EMBODIMENTS

The method and system of the present invention is described herein with respect to an Active Design Process Management (ADPM), a state-based design process model whereby team members receive constraint-based feedback (provided by the invention) on their operations and use it to apply design space search heuristics effectively. This guidance or feedback reduces and helps resolve conflicts.

Background

ADPM is based on a design process modeling framework that is built on previous work and emphasizes the role of constraints. In this framework, a design is characterized by a set of variables called properties. A design property, denoted by $\alpha_i$, is a variable that can take one or more values from a range $E_i=\{v_j^i, j=1, \ldots, N_i^v\}$, where $N_i^v$ is the total number of values a variable can achieve. Values may be numbers, strings, tuples, or complex descriptions. A property $\alpha_i$ to which a single value has been assigned is said to be bound; otherwise, it is unbound with an implicit value of $\alpha_i \equiv E_i$. The properties of a correct design must satisfy a set of constraints. A design constraint is a relation, $c_i$, among a set of properties:

$$c_i(\alpha_i):S_i \to \{T, F\}, \quad (1)$$

where $\alpha_i=\{\alpha_j, j=1, \ldots, N_i^A\}$ denotes the arguments of $c_i$, and $S_i$ denotes the cross-product of all possible argument values, i.e., the design subspace restricted by $c_i$, and $N_i^A$ is the total number of variables within a constraint. For example, constraint $c_i$, given by $P_f+P_s \leq P_M$, relates a receiver circuit's power consumption requirement, $P_M$, its analog front-end power, $P_f$, and its digital deserializer power, $P_s$. A constraint $c_i$ is said to be satisfied if it holds for all combinations of the current argument values; violated if it returns false for all combinations; and consistent otherwise. The status of $c_i$, denoted by $s(c_i)$, indicates whether $c_i$ is satisfied ($s(c_i)=T$), violated ($s(c_i)=F$), or otherwise ($s(c_i)=$ Unknown).

A design problem, denoted by $p_i$, is given by ($I_i$, $O_i$, $T_i$, where $I_i$ is the set of input properties, $O_i$ is the set of output properties, and $T_i=\{c_i, j=1, \ldots, N_i^C\}$ is a set of constraints relating a subset of $p_i$'s properties. A solution for $p_i$ is an assignment for $p_i$'s outputs that satisfies all constraints in $T_i$. Each problem has a status indicating its level of accomplishment (e.g., "solved"). A design operator, denoted by $f_j$, is a function that helps solve a problem $p_i$ by: (a) computing values for $p_i$'s outputs (synthesis and optimization operators), (b) verifying that a solution meets one or more constraints in $T_i$ (verification operators), or (c) decomposing $p_i$ into a partially-ordered subproblem set (decomposition operators). In practice, operators are typically implemented by CAD tools. An operator $f_j$ may take one or more parameters, e.g., for a synthesis tool, a parameter may determine whether area or delay is optimized. A design operation, denoted by $\theta$, is given an operator $f_j$, a problem $p_l$ to which $f_j$ is applied, and $f_j$'s parameter values.

A design process is a state-based system that goes through a series of design states. The design process history at stage n is given by $H_n=\{(<s_i, \theta_i>, i=1, \ldots, -1) \cup s_n\}$, where $s_i$ and $\theta_i$ denote the design process state and the applied operation at stage i, respectively. Each $s_i$ consists of: the design object hierarchy, i.e., the set of all design objects currently under design, where each object is a set of properties that represent a part of the design; the design problem hierarchy, i.e., the set of all formulated design problems; and the network of constraints, denoted by $C_i=\{c_i, j=1, \ldots, N_i^C\}$, where $N_i^C$ is the total number of design constraints. The design space at stage n is given by the cross-product of all property value ranges in $s_n$. A design transition, denoted by $t_n$, is a pair of consecutive states ($S_n$, $S_{n+1}$). $S_{n+1}$ results from applying the next-state function, $\delta$, to $S_n$:

$$S_{n+1}=\delta(S_n, \theta_n), \quad (2)$$

where $\theta_n$ is the operation executed at stage n. The function $\delta$ applies $\theta_n$'s operator to a problem in $s_n$, and updates the state to $s_{n+1}$. $\delta$ implementation depends on how the design process is managed.

The ADPM Design Process Model

In general, the design management system in FIG. 1 is a state-based system composed of a novel design process manager system that applies the operations requested by designers. Unlike conventional design process managers, this manager generates any necessary constraints and incorporates them in the design state. A constraint manager runs an algorithm to compute conflict information (constraint violations and infeasible variable values) related to these constraints. The design process manager receives this information and consolidates it into data that, when fed back to designers, directly supports constraint-based heuristics. This consolidation and feedback is unique in this invention, as no existing design process management systems provide them.

Based on the constraint-related information, a notification manager notifies designers of relevant constraint-related events that might be otherwise unnoticed. Designers can also access this information directly from the design process manager.

In particular, ADPM's transition model is graphically compared with conventional approaches in FIG. 1. For conventional approaches, the implementation of δ features a design process manager (DPM) component. In practice, the DPM connects the user with conventional CAD tools and may range from a raw OS interface to a complete process management system such as Minerva II. The implementation of δ in ADPM adds a Design Constraint Manager (DCM) and a Notification Manager (NM). To address a problem $p_i$, a designer sends an operation request $\theta_n$ to the DPM, which takes as input $\theta_n$ and the previous state $s_n$. After applying $\theta_n$'s operator on $p_i$, the following tasks are undertaken:

Update of design state. The DPM updates the problem hierarchy in $s_n$, including $p_i$, based on the operation results. However, unlike conventional approaches, this DPM also generates any necessary constraints and incorporates them in $C_n$. The resulting $C_{n+1}$, including the current values of $C_{n+1}$'s properties, is then sent to the DCM for evaluation. The DCM then runs a constraint propagation algorithm to compute infeasible property values and the status of all constraints. Constraint evaluation details are delegated to constraint-based systems and CAD tools. The result is sent back to the DPM, which properly updates $C_{n+1}$ and the status of design problems. Constraint information is consolidated into data that explicitly supports heuristics as described below, and the design state is properly labeled with this data. The new state $s_{n+1}$ is included in the design history and made available to designers.

Communication of state information. The NM alerts designers of constraint-related events, including violations and reductions of a property's feasible subspace. It selects subsets of $H_{n+1}$ relevant to each designer and includes them in notifications. Notifications alert designers of key information that might otherwise go unnoticed, thereby encouraging them to use that information when choosing operations.

ADPM may require more computer resources than conventional approaches. While each CAD tool is executed only upon a designer's request in conventional approaches, additional tool runs are typically performed within ADPM's constraint propagation algorithm. This extra computation, though, allows ADPM to directly support constraint-based heuristic application. Key constraint-related information is automatically generated in a timely manner, and is organized to provide direct heuristic guidance. Notifications encourage designers to use the most relevant portions of this information when choosing an operation.

Constraint-Based Heuristic Application Support

In general, the invention supports several constraint-based heuristics. First, it supports heuristics based on feasible subspaces. To do so, the method computes and provides feedback about the values for each design variable that were not found to be infeasible given the design's constraints. This information helps designers focus first on the most difficult or "constrained" parts of the design space, thereby reducing the number of late constraint violations. Second, this invention supports heuristics based on the number of constraints. This is done by computing and feeding back the number of constraints associated with each design variable, thereby also helping focus first on the most "constrained" parts of the design space. Finally, the method supports heuristics based on the number of constraint violations. Such support helps solve violations as it indicates what design operations may fix many violations at a time. To provide this support, the method computes and feeds back the number of violations associated with each variable to team members.

In particular, ADPM directly supports constraint-based heuristics by virtue of several types of information as now described.

Heuristics Based on Feasible Subspaces

For each property $a_i$, its feasible subspace $f_F(a_i)$ is given by the values that were not found to be infeasible by constraint evaluation. Feasible value information helps designers prune substantial design subspaces and thus quickly meet specifications. Design operations should be intended to bind problem outputs to values from their feasible subspace. Additionally, this information can help choose the order in which properties are bound. The following heuristic is supported: focus first on problems that target properties with the smallest feasible subspaces. By using this heuristic, it is expected that most violations happen early, since difficult subspaces are given priority. Similar variable ordering heuristics exist in constraint satisfaction algorithms.

Heuristics Based on Number of Constraints

Another helpful heuristic based on existing constraint satisfaction heuristics is to execute operations that target properties connected to many constraints. It is intended to help focus first on very "constrained" properties. In ADPM, designers can apply this heuristic as they receive information about: a) constraints involved in each design problem; and b) constraints where each property appears. To help apply this heuristic, one associates a variable, denoted by $\beta_i$, with each property $\alpha_i$. $\beta_i$ is the number of constraints where $\alpha_i$ appears: $\beta_i = |\{c_j | a_i \epsilon \alpha_j\}|$. Extensions of this heuristic are possible. Specifically, $\beta_i$ may also include constraints indirectly related to $\alpha_i$ by an intermediate constraint.

Heuristics Based on Constraint Violations

Timely constraint violation information allows backtracking to start early. It can also be used as the basis of a heuristic for fixing violations; specifically, to modify values of properties connected to many violations. This heuristic may help resolve multiple conflicts with a single operation and thus exit the infeasible part of the design space fast. ADPM supports this heuristic by providing designers with the following information: a) for each problem, all conflicts affecting any of its properties; and b) for each property, all conflicts where the property is involved. To help apply this heuristic, one associates a variable, denoted by $\alpha_i$, with each property $\alpha_i$. $\alpha_i$ is the number of violated constraints where $\alpha_i$ appears:

$$\alpha_i = |\{c_j | (\alpha_i \epsilon \alpha_j) \wedge (s(c_j) = F)\}| \tag{3}$$

Constraint-Based Heuristics in Minerva III

In general, a prototype was built to demonstrate the new capabilities of this invention. These capabilities are illustrated by means of screenshots for an example collaborative design process. In this example, the prototype (called Minerva III) is shown to effectively support heuristics based on feasible subspaces, number of constraints, and number of constraint violations, thereby reducing and facilitating the resolution of conflicts.

In particular, the constraint-based heuristic support of the invention was implemented in the Minerva III design process manager. This support is described with an example: the team-based design of a MEMS-based wireless receiver front-end subject to gain, power, bandwidth, and frequency precision constraints. The example focuses on the concurrent design of: a) the low-noise amplifier (LNA) and mixer, and b) a MEMS filtering device. The team includes a leader, a device engineer, and an analog circuit designer. (Although ADPM is envisioned for use by larger teams, this example is large enough to highlight the differences between ADPM and traditional approaches). Using Minerva III's object browser (see FIG. 2), the circuit designer can view property values not found to be infeasible (including design variables and performance parameters), related to his LNA and mixer. This feature helps choose operations that bind problem outputs to values from their feasible subspace. It also supports a heuristic: to focus first on properties with the smallest feasible subspaces. As FIG. 2 shows, all values for the frequency inductor property ("Freq-ind") are infeasible except for the interval (0.17, 0.5) μH. This value set is small when compared with the feasible set for the differential pair width property ("Diff-pair-W"), which encourages the circuit designer to focus on the inductor design first.

Using Feedback About Constrained Subspaces

Before committing to a design operation, the designer considers other constraint-related information. Using Minerva III's constraint and property browser (see FIG. 3), the designer views in what constraints each property appears. This information supports another heuristic: to give priority to properties that appear in many constraints. As the "Properties" pane shows, the differential pair width property ("Diff-pair-W") appears in three constraints: power consumption, input impedance, and gain. Thus, $\beta_2=3$, where $\beta_2$ is the number of constraints where this property appears.

The designer uses the constraint-related information shown in FIGS. 2 and 3 when working on the LNA. Of the many tasks on which the designer could focus, two are suggested as important by this information. The designer first focuses on the design of the load inductor, because its feasible value set is very small. By invoking a schematic editor from Minerva III, a value of 0.2 μH is chosen, which does not result in any detected conflict. The differential pair transistors are then sized. A size of 2.5 μm is chosen because it is the smallest potentially feasible value (see FIG. 2), and will reduce power consumption.

Unfortunately, the chosen values lead to a violation of the global gain requirement, which concerns both the circuit designer and the device engineer. The team leader worsens the situation by tightening the input impedance requirements to 40 Ω, which leads to an impedance violation as well.

Using Feedback for Conflict Resolution

The designer invokes the constraint and property browser again to try to resolve these conflicts (see FIG. 4). In this case, the number of violations related to each property is examined, shown in the "Connected violations" column of the "Properties" window pane. This information supports another heuristic: to backtrack on a property connected to many violations. Based on this heuristic, the designer chooses to work on the differential pair width, as this property is connected to two violations, i.e., $\alpha_2=2$. Since larger transistors will improve gain and input impedance matching, the designer decides to increase the value of the differential pair width to 3.5 μm. Constraint propagation is run again and no conflicts are found. Both violations have been fixed with a single iteration.

In summary, constraint-related information is computed using constraint generation and propagation techniques, and then "mining" the results into data that directly supports search heuristics (e.g., the number of violations related to each design variable). This heuristic support data accounts for the simultaneous effect of all constraints and thus may significantly reduce design iterations.

The following unique benefits are provided by the method and system of the present invention:

Quantitative feedback is provided that directly supports the application of constraint-based heuristics, including the three types of heuristics mentioned above. This support accelerates the design process by reducing the number of operations required to complete a design, thereby having a significant impact on time-to-market.

This constraint-based, heuristic-supporting feedback is automatically generated and includes the effect of all constraints in the design, including the ones that involve multiple designers.

This constraint-based heuristic-supporting feedback is meaningful as it is presented in the context of the tasks to be pursued in the design.

While the best modes for carrying out the invention have been described in detail, those familiar with the art to which this invention relates will recognize various alternative designs and embodiments for practicing the invention as defined by the following claims.

What is claimed is:

1. A method for providing constraint-based guidance to a designer in a collaborative design environment, the method comprising:

receiving signals from designers wherein the signals represent design choices for variables of a design;

generating a network of design constraints which represent interactions among the variables of the design;

evaluating the network of design constraints to obtain conflict information in response to the signals; and transmitting signals to designers affected by the conflict information to provide constraint-based guidance to the affected designers in the collaborative design environment.

2. The method as claimed in claim 1 wherein the conflict information includes feasible or infeasible values for the variables of the design.

3. The method as claimed in claim 1 wherein the conflict information includes design constraints associated with the variables of the design.

4. The method as claimed in claim 1 wherein the conflict information includes constraint violations associated with the variables of the design.

5. The method as claimed in claim 1 wherein the design is an engineering design.

6. The method as claimed in claim 1 wherein the design is a complex financial plan.

7. The method as claimed in claim 1 wherein the step of evaluating includes the step of applying a constraint propagation algorithm to the network of design constraints to compute the conflict information.

8. The method as claimed in claim 1 wherein the design constraints have an arbitrary form.

9. The method as claimed in claim 1 wherein the conflict information includes feasible or infeasible values for the variables of the design, design constraints associated with the variables of the design and constraint violations associated with the variables.

10. The method as claimed in claim 1 wherein the guidance is constraint-based heuristic support.

11. A system for providing constraint-based guidance to a designer in a collaborative design environment, the system comprising:
- means for receiving signals from designers wherein the signals represent design choices for variables of a design;
- a design process manager for generating a network of design constraints which represent interactions among the variables of the design;
- a constraint manager for evaluating the network of design constraints to obtain conflict information in response to the signals; and
- a notification manager for transmitting signals to designers affected by the conflict information to provide constraint-based guidance to the affected designers in the collaborative design environment.

12. The system as claimed in claim 11 wherein the conflict information includes feasible or infeasible values for the variables of the design.

13. The system as claimed in claim 11 wherein the conflict information includes design constraints associated with the variables of the design.

14. The system as claimed in claim 11 wherein the conflict information includes constraint violations associated with the variables of the design.

15. The system as claimed in claim 11 wherein the design is an engineering design.

16. The system as claimed in claim 11 wherein the design is a complex financial plan.

17. The system as claimed in claim 11 wherein the constraint manager applies a constraint propagation algorithm to the network of design constraints to compute the conflict information.

18. The system as claimed in claim 11 wherein the design constraints have an arbitrary form.

19. The system as claimed in claim 11 wherein the conflict information includes feasible or infeasible values for the variables of the design, design constraints associated with the variables of the design and constraint violations associated with the variables.

20. The system as claimed in claim 11 wherein the guidance is constraint-based heuristic support.

* * * * *